July 18, 1950  P. E. BISCH ET AL  2,515,437
ILLUMINATED MIRROR DEVICE
Filed Nov. 12, 1946  2 Sheets-Sheet 1

INVENTORS
George G. Edlen
John P. Dobbins
Paul E. Bisch
BY

July 18, 1950   P. E. BISCH ET AL   2,515,437
ILLUMINATED MIRROR DEVICE
Filed Nov. 12, 1946   2 Sheets-Sheet 2
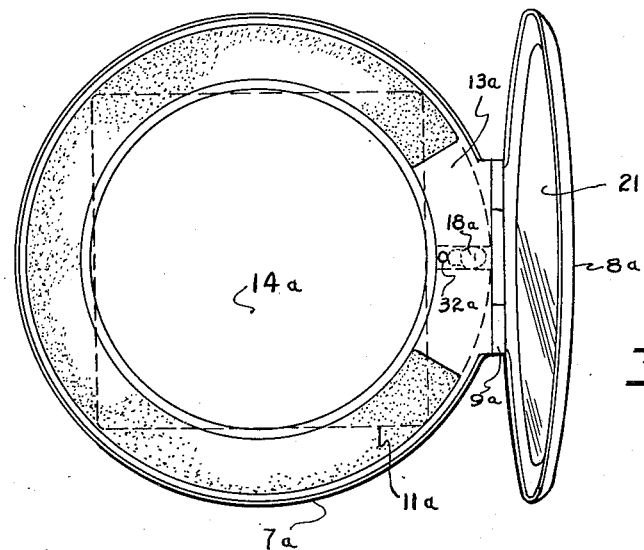
Fig. 5
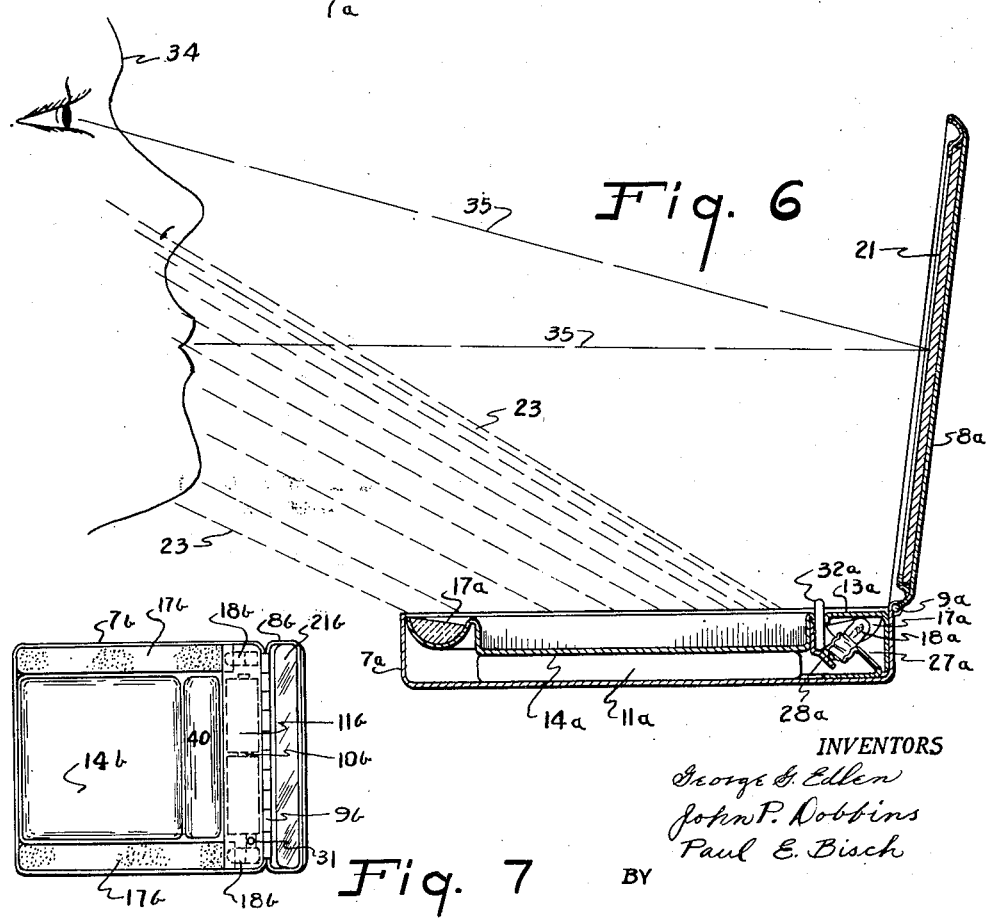
Fig. 6
Fig. 7
INVENTORS
George S. Ellen
John P. Dobbins
Paul E. Bisch
BY Patented July 18, 1950

2,515,437

UNITED STATES PATENT OFFICE 2,515,437

ILLUMINATED MIRROR DEVICE

Paul Eugene Bisch, John P. Dobbins, and George G. Edlen, Los Angeles, Calif.

Application November 12, 1946, Serial No. 709,130

11 Claims. (Cl. 240—6.45)

This invention relates to the provision of illumination in connection with a small mirror device, such as a vanity case, small hand mirror, lady's handbag, bag mirror or compact, or an automobile mirror. The general object of our invention is to provide a means for illuminating the face of a person looking into such a mirror, sufficiently to permit a clear image of the face to be viewed in the mirror.

A particular object of the invention is to provide a small mirror device, such as a vanity case, having self-contained illuminating means, which includes means, such as small flashlight-type batteries or dry cells, for energizing one or more small electric light bulbs. We have found that the problem of utilizing such a source of current in connection with a small light bulb or bulbs, to produce adequate illumination, is a difficult one. A number of trial proposals directed toward this general end have not proven to be satisfactory. The employment of an arrangement intended to throw the direct rays of light from a light source upon the face of a person has the objectionable characteristic of casting a glare into the person's eyes, which makes it difficult to see the reflection in the mirror. Early attempts to utilize a concealed source of light, transmitting light rays through a transmitting element of a material having the light-refracting characteristics of polymethyl methacrylate, embodied the objection that the light rays were relatively weak and also produced some glare, which, though not as marked as that produced by direct illumination, was, nevertheless, sufficient to obscure the fairly low intensity image produced in the mirror.

Our invention has solved these problems by utilizing an arrangement of a light-transmitting element or elements of a material having substantially the light refracting characteristics of the acrylic resins, such as polymethyl methacrylate, receiving light from one or more light sources arranged to be remote from the face of the person looking into the mirror while holding a vanity case in a natural position, together with a mirror adapted to lie in a plane transverse to the plane of the light-emitting device. In a vanity case, this arrangement is achieved by placing the light-emitting device in the body portion of the vanity case and the mirror in the cover thereof. The natural position of the vanity case during use is that in which the body of the case is held horizontally and the cover projects upwardly. The light rays for illuminating the face may thus be projected upwardly and toward the face on an incline, while the eyes of the person are directed at a higher level, into the mirror which extends above the upper line of the light rays. Thus, it becomes possible for the illuminated reflection of the face to be viewed in the mirror without any glare in the eyes.

A further object of the invention is to provide a compact or vanity case embodying a self-contained illuminating mechanism which is fully concealed except for the light-emitting surface of the light-transmitting ring, and in which this light-emitting surface constitutes a pleasing and ornamental portion of the visible part of the vanity case.

Another object is to provide for automatic energization of the illuminating means upon opening the lid of the vanity case and cutting off the illuminating means when the lid is closed.

A further object is to provide a vanity case, or the like, having an illuminating mechanism of relatively simple and inexpensive construction embodied therein.

Other objects of our invention will become apparent in the ensuing specifications, taken in connection with the appended drawings, in which:

Fig. 5 is a plan view of a vanity case embodying a modified form of our invention;

Fig. 6 is a sectional view of the vanity case shown in Fig. 5, taken on the line 6—6 of that figure; and Fig. 7 is a plan view of a compact embodying another modification of the invention.

Figure 1:
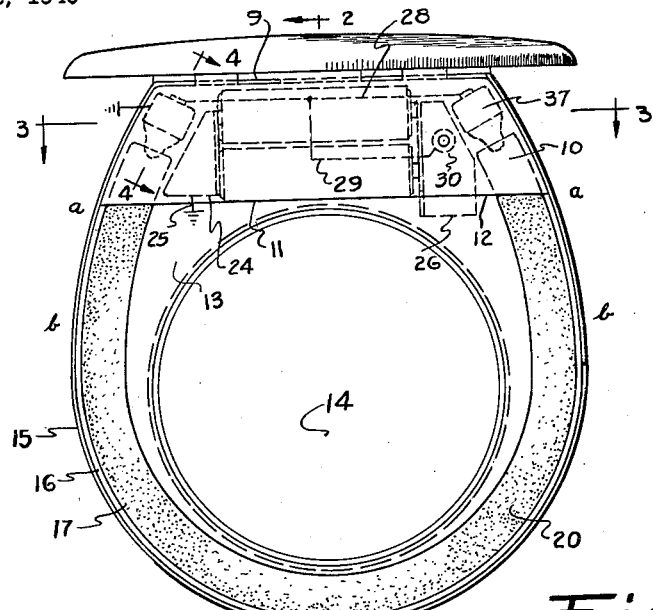
Fig. 1 is a plan view of a vanity case embodying our invention.
Figure 2:
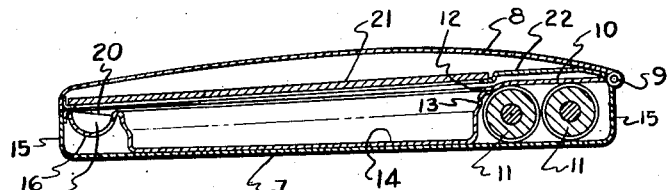
Fig. 2 is a sectional view of the same, taken on a line 2—2 of Fig. 1.

As an example of one form in which our invention may be embodied, we have shown in Figs. 1 to 4 inclusive a vanity case embodying a body-casing section 7 and a lid 8 hinged thereto by means of a hinge 9. This vanity case has the general shape of a horseshoe, the side defined by the hinge 9 being a straight side. Also attached to the hinge 9 is a plate 10 which provides a cover for a pair of dry cells. The cover 10 has a side extremity 12, parallel to the hinge 9, which overlaps one side of an annular flange 13 of a powder tray 14, which occupies the space between the cover 10 and the extremity of the case body 7 opposite the hinge 9. The flange 13 lies in a plane immediately below the plane of the cover 10, and just slightly below the plane of the upper edge of the lateral wall 15 of the case body 7. Formed in the flange 13 is a trough 16 which is horseshoe-shaped and extends alongside the lateral wall 15 from one end of the cover 10 and back to the other end thereof. The upper surface of the trough 16 is provided with a reflecting surface which extends from the points $a$ to the points $b$ in Fig. 1 (or if desired a reflecting surface may extend throughout the length of the trough 16, although this is not essential).

Figure 4:
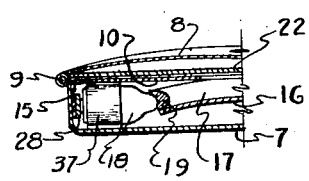
Fig. 4 is a fragmentary sectional view of the same, taken on the line 4—4 of Fig. 1.

Mounted in the trough 16 is a horseshoe-shaped light-transmitting element 17, the ends of which are extended beneath the cover 10. Two small flashlight bulbs 18 are mounted, one at either end of the cover 10. The bulbs 18 are associated with the respective ends of the light-transmitting element 17. As shown in Fig. 4, the lens of each bulb 18 may be in actual contact with a cavity 19 in the end of the light-transmitting element. The light-transmitting element 17 has an etched upper surface 20 which is inclined downwardly and inwardly, being generally frustro-conical.

A mirror 21 is mounted in the lid 8 by means of a mirror frame 22 which is pressed into the lid 8. A majority of the peripheral edge of the mirror 21 is confined between the frame 22 and the peripheral portion of the lid 8. In the form shown in the drawings, the mirror 21 is circular, although it is to be understood that other shapes may be employed.

Being of polymethyl methacrylate or material having equivalent light-refracting properties, the transmitting element 17 is adapted to transmit the rays of light from the bulbs 18 throughout its curved extent. The back surface of the transmitting element 17 is highly polished and preferably continuously curved in cross-section, so as to prevent the escape of light rays from the transmitting element, except through the etched surface 20. Because of the high index of refraction of the material of the transmitting element 17, light rays transmitted into one end thereof will, as they strike the polished surfaces thereof, be reflected back into the interior of the transmitting element until they strike the etched surface 20. This characteristic arises from the fact that light rays, in escaping from a body having a high index of refraction into a medium having a low index of refraction (such as air) will be bent toward the surface from which they are escaping. At exactly 90 degrees, the rays will of course be emitted without bending. As the rays strike the surface at more and more oblique angles, they will be bent to a succeedingly higher degree until finally the bending brings them parallel with the surface and beyond that point they will be reflected back into the transmitting element. As a result, it is possible for the rays to be reflected back and forth from one side to the other of the transmitting element, while proceeding obliquely from one end to the other thereof, and thus the transmission of the rays in this manner may be described as "piping." Since an etched surface is composed of a large number of minute surfaces inclined in many different directions, a large percentage of the light rays striking the etched surface will escape because of striking many of the minute surfaces at angles approaching right angles. From the etched surface 20, the light rays will be dispersed somewhat as indicated by the broken lines 23 in Fig. 6. We find that the majority of the light rays transmitted from the etched surface 20 will be inclined away from the light sources 18. Also, the greatest intensity of light ray emission is concentrated in the arms of the transmitting element 17, adjacent the light sources, i. e., just beyond the edge 12 of the cover 10. This is indicated by the closer spacing of the lines 23 in Fig. 6.

It will now be apparent, from Fig. 6, that with the vanity case held in a normal position in front of and slightly below the face 24 of a person using the same, with the body portion 7 substantially horizontal and the mirror 21 substantially vertical, that the rays 23 will strike the face 34 at an angle sufficiently divergent from the angle at which the line of sight 35 is directed to the mirror 21, to eliminate glare in the eyes of the person using the vanity case.

At the same time, the emitted rays 23 will strike the face at such an angle as to adequately illuminate those portions of the face to which cosmetics are ordinarily applied.

Figure 3:
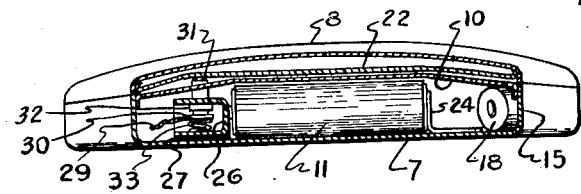
Fig. 3 is a sectional view of the same, taken on a line 3—3 of Fig. 1.

The dry cells 11 are confined endwise between a bracket 24 which is electrically grounded to the case 7 as indicated at 25 in Fig. 1 and a bracket 26 which is mounted on an insulating block 27. The bulbs 18 are each mounted in a bracket 37 which may form an electrical ground connection to the case 7, and their end terminals are in contact with a bus-bar 28, suitably insulated from the case 7. The bus-bar 28 is indicated schematically in Fig. 1, and is connected by a suitable connector 29 to a movable contact 30 of a switch 30, 32, which is shown in Fig. 3. The switch may be of any conventional construction, including, for example, a movable contact 30 and a stem 31 of insulating material mounted in a bushing 32 which is secured to the underside of the bracket 26, and constitutes the fixed contact of the switch. The stem 31 projects upwardly through an opening in the cover 10, to a position where it will be engaged by the mirror frame 22 as the lid 8 is closed, and be depressed so as to move the contact 30 out of engagement with the bushing 32, thereby breaking contact in the switch 30, 32. Conversely, when the lid 8 is raised, the stem 31 will be freed for upward movement under the yielding pressure of a spring 33, thrusting upwardly against the contact 30.

It may now be noted that the dry cells 11 are confined within a space defined between the powder tray 14 and the straight portion of the peripheral wall 15 of the case body 7 at the hinge 9, and between the brackets 24 and 26. Dry cells may be quickly replaced by lifting the cover 10, lifting the used cells out of this space and inserting fresh cells. The brackets 24 and 26 are so spaced as to snugly engage the respective ends of the dry cells and establish electrical contact therewith.

When the lid of the compact is opened, the lights will automatically be turned on, and when the lid is closed, the lights will be automatically turned off by the actuation of the switch 30, 32 in the manner previously described.

In the form of the invention illustrated in Figs. 5 and 6, the shape of the vanity case is circular instead of horseshoe-shaped, and instead of the two cylindrical dry cells 11, we employ a thin pancake-type cell 11a, which is interposed between the bottom of the powder tray 14a and the bottom of the case body 7a. A single electric light bulb 18a is mounted in a socket 27a (which is grounded to the case 7a), and its end contact engages a contact 28a, which may comprise an extension of the cell 14a. A stem 32a, slidably extended through the flange 13a of the tray 14a, is pressed downwardly against the contact 28a when the lid 8a is closed, so as to move the contact 28a out of engagement with the bulb 18a. The light-transmitting element 17a is in the form of a split ring with the bulb 18a interposed between the ends thereof, and having a frusto-conical, etched upper light-emitting surface 20a and reflecting lower and side surfaces backed up by the trough 15a which may have a reflecting surface, at least in the vicinity of the light bulb 18a.

As shown in Fig. 7, the invention may be embodied in a rectangular vanity case including a body section 7b, a lid 8b, having a mirror 21b, a powder tray 14b, having a lipstick compartment 40, and a battery and bulb compartment covered by a cover 10b hinged to the hinge 9b which connects the lid 8b to the body section 7b. The light-transmittting means may be in the form of two bars 17b of material of the type previously specified, arranged along the respective sides of the case, each lighted by an individual electric light bulb 18b, having a light-emitting upper surface inclined downwardly and toward the center of the case, and having light-reflecting lower and side surfaces.

We claim:

1. In a vanity case or the like, a case including a body section and a lid hinged thereto, a mirror mounted in said lid, and illuminating mechanism mounted in said body section, including a light-transmitting element of a material having a high index of refraction, lying just inside the peripheral wall of said body portion and extending around a substantial portion of said peripheral wall, said element having a light-emitting surface that is disposed generally in a plane parallel to the bottom of said body portion, a light source associated with an end of said transmitting element, and means covering said end and said light source and preventing the direct transmission of light from said source to the face of a person using the vanity case said element being adapted, when the vanity case is held before the face of a user, with the body portion generally horizontal and the mirror extending upwardly and centered somewhat below the level of horizontal vision at a sufficient distance from the eyes to permit reflection vision of the face therein, to project, mainly upon the lower portion of the face, a low intensity diffused illumination sufficient to render the reflected image of the face visible in the dark without casting a glare into the eyes such as to interfere with vision of such reflected image.

2. In a vanity case or the like, in combination with a case including a body section and a lid hinged thereto, a mirror mounted in said lid, a light-transmitting element disposed within and adjacent to the peripheral wall of said body section, said light-transmitting element being generally U-shaped and a pair of light sources associated with the ends of the respective legs of said light-transmitting element said element being adapted, when the vanity case is held before the face of a user, with the body portion generally horizontal and the mirror extending upwardly and centered somewhat below the level of horizontal vision at a sufficient distance from the eyes to permit reflection vision of the face therein, to project, mainly upon the lower portion of the face, a low intensity diffused illumination sufficient to render the reflected image of the face visible in the dark without casting a glare into the eyes such as to interfere with vision of such reflected image.

3. A vanity case or the like as claimed in claim 2, including dry cell means for energizing said light sources, and a cover covering said dry cell means, said light sources and the ends of said legs.

4. In a vanity case or the like, in combination with a case including a body section and a lid hinged thereto, a mirror mounted in said lid, means for illuminating the face of a person viewing his reflection in said mirror, said means comprising a light-transmitting element of a material having the characteristics of polymethyl methacrylate having a high index of refraction, said element carried by said body section and being generally of annular shape, having on one side a highly polished surface for inhibiting the escape of light rays and on its other side a roughened light-emitting surface of generally frusto-conical shape in combination with a light source arranged for the transmission of light rays into one end of said light-transmitting element said element being adapted, when the vanity case is held before the face of a user, with the body portion generally horizontal and the mirror extending upwardly and centered somewhat below the level of horizontal vision at a sufficient distance from the eyes to permit reflection vision of the face therein, to project, mainly upon the lower portion of the face, a low intensity diffused illumination sufficient to render the reflected image of the face visible in the dark without casting a glare into the eyes such as to interfere with vision of such reflected image.

5. In a vanity case or the like, in combination with a case including a body section and a lid hinged thereto, said body section having a bottom wall and a peripheral wall, a powder tray disposed in said body section and spaced from said bottom and peripheral walls, a light-transmitting element, generally annular in shape, interposed between the periphery of said powder tray and said peripheral case wall, said light-transmitting element being of a material having a high index of refraction and having its lower side provided with a surface for inhibiting the escape of light rays and its upper side provided with a light-emitting surface, a light source arranged to transmit light rays into said light-transmitting element and a dry cell for energizing said light source, said dry cell being of pancake form and disposed between the bottom of said powder tray and said body case wall said element being adapted, when the vanity case is held before the face of a user, with the body portion generally horizontal and the mirror extending upwardly and centered somewhat below the level of horizontal vision at a sufficient distance from the eyes to permit reflection vision of the face therein, to project, mainly upon the lower portion of the face, a low intensity diffused illumination sufficient to render the reflected image of the face visible in the dark without casting a glare into the eyes such as to interfere with vision of such reflected image.

6. In a vanity case or the like, a case including a body portion and a lid, a mirror mounted in said lid, a light transmitting element extending from a point near the rear end of the case to a point near the forward end of the case, and a source of illumination arranged adjacent the rear end of said transmitting element so as to project its rays directly into said end, said transmitting element being of a transparent material having a high index of refraction and having polished under and side surfaces adapted to reflect oblique light rays inwardly to inhibit their escape and thereby cause said light rays to be piped longitudinally within said transmitting element toward its forward end, said transmitting element having an upper surface which is roughened so as to provide for emission of said light rays upwardly and forwardly, whereby, when the vanity case is held before the face of a user, with the body portion generally horizontal, the transmitting element facing upwardly and the mirror extending upwardly and centered somewhat below the level of horizontal vision at a sufficient distance from the eyes to permit reflected vision of the face therein, said transmitting element will project, mainly upon the lower portion of the face, a low intensity diffused illumination sufficient to render the reflected image of the face visible in the dark without casting a glare into the eyes such as to interfere with vision of such reflected image.

7. A vanity case as defined in claim 6, wherein there are two of said transmitting elements, one on either side of the case extending along the respective side margins thereof, and wherein the upper light emitting surfaces thereof are substantially flat and parallel to the general plane of the case.

8. A vanity case as defined in claim 7, wherein said light transmitting elements are straight and substantially parallel, and the case is of rectangular shape.

9. A vanity case as defined in claim 6, wherein said transmitting element is in the form of a split ring having two ends both in direct light receiving association with said illumination source, wherein said case has a rounded periphery and said transmitting element extends closely along said periphery, and wherein said light emitting surface is generally conical, inclined inwardly and downwardly.

10. A vanity case as defined in claim 6, wherein said case includes an opaque part interposed directly between said illumination source and the area to be illuminated, whereby to prevent transmission of direct rays of light to said area.

11. In a vanity case or the like, a case including a body portion and a lid, a mirror mounted in said lid, an elongated light transmitting element mounted in said case and a source of illumination arranged adjacent an end of said transmitting element so as to project its rays directly in said end, said transmitting element being of a transparent material having a high index of refraction and having polished under and side surfaces adapted to reflect oblique light rays inwardly to inhibit their escape and thereby cause said light rays to be piped longitudinally within said transmitting element toward its other end, said case including an opaque part covering said illumination source so as to prevent rays therefrom being transmitted directly to the area to be illuminated, said transmitting element having an upper surface which is roughened so as to provide for emission of said light rays upwardly and forwardly, whereby, when the vanity case is held before the face of a user, with the body portion generally horizontal, the transmitting element facing upwardly and the mirror extending upwardly and centered somewhat below the level of horizontal vision at a sufficient distance from the eyes to permit reflected vision of the face therein, said transmitting element will project, mainly upon the lower portion of the face, a low intensity diffused illumination sufficient to render the reflected image of the face visible in the dark without casting a glare into the eyes such as to interfere with vision of such reflected image.

PAUL EUGENE BISCH.
JOHN P. DOBBINS.
GEORGE G. EDLEN.

REFERENCES CITED

The following references are of record in the file of this patent:

UNITED STATES PATENTS

| Number | Name | Date |
| --- | --- | --- |
| 1,464,552 | Warner | Aug. 14, 1923 |
| 2,092,355 | Mailloux | Sept. 7, 1937 |
| 2,119,267 | Coleman | May 31, 1938 |
| 2,140,972 | Rylsky | Dec. 20, 1938 |
| 2,261,978 | Dirksen | Nov. 11, 1941 |
| 2,270,636 | Klarfield | Jan. 20, 1942 |
| 2,302,043 | Matway | Nov. 17, 1942 |
| 2,365,864 | Chapman | Dec. 26, 1944 |
| 2,402,014 | Boeck | June 11, 1946 |